(12) United States Patent
Klitgaard et al.

(10) Patent No.: US 11,215,166 B2
(45) Date of Patent: Jan. 4, 2022

(54) ASSEMBLY ASSISTING DEVICE FOR ASSISTING OF THE ASSEMBLING OF TWO WIND TURBINE COMPONENTS OF A WIND TURBINE AND METHOD FOR ASSEMBLING OF THE TWO WIND TURBINE COMPONENTS

(71) Applicant: Siemens Gamesa Renewable Energy A/S, Brande (DK)

(72) Inventors: Joergen Klitgaard, Brande (DK); Christian Nielsen, Vejle (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 72 days.

(21) Appl. No.: 16/487,468

(22) PCT Filed: Nov. 27, 2017

(86) PCT No.: PCT/EP2017/080459
§ 371 (c)(1),
(2) Date: Aug. 21, 2019

(87) PCT Pub. No.: WO2018/153522
PCT Pub. Date: Aug. 30, 2018

(65) Prior Publication Data
US 2020/0056591 A1    Feb. 20, 2020

(30) Foreign Application Priority Data

Feb. 23, 2017  (DE) ...................... 10 2017 202 927.7

(51) Int. Cl.
*F03D 13/10*   (2016.01)
*B25H 3/04*    (2006.01)

(52) U.S. Cl.
CPC ............... *F03D 13/10* (2016.05); *B25H 3/04* (2013.01); *F05B 2230/60* (2013.01); *F05B 2260/301* (2013.01)

(58) Field of Classification Search
CPC ....... F03D 13/10; F25H 3/04; B05B 2230/60; B05B 2260/301
See application file for complete search history.

(56) References Cited

U.S. PATENT DOCUMENTS 6,767,165 B1 * 7/2004 Corbetta ................. E21B 41/04
405/158
8,678,136 B1   3/2014 Hamilton
(Continued)

FOREIGN PATENT DOCUMENTS

CN    101649929 A    2/2010
CN    201443476 U    4/2010
(Continued)

OTHER PUBLICATIONS

International Search Report dated Mar. 27, 2018 for Application No. PCT/EP2017/080459.
(Continued)

*Primary Examiner* — David P Bryant
*Assistant Examiner* — Nirvana Deonauth
(74) *Attorney, Agent, or Firm* — Schmeiser, Olsen & Watts LLP

(57) ABSTRACT

An assembly assisting device for assisting an assembling of at least two wind turbine components of a wind turbine is provided. The assembly assisting device includes at least one bolt magazine with at least one bolt magazine store unit for storing bolts for the assembling and at least one bolt magazine attaching unit for attaching the bolt magazine to at least one attaching structure of at least one of the wind turbine components. In addition, a method for assembling at
(Continued)

least two wind turbine components of the wind turbine with following steps is provided: a) providing of the wind turbine components and providing of at least one assembly assisting device including bolts and b) assembling of the wind turbine components with the aid of the bolts of the bolt magazine store unit of the assembly assisting device.

9 Claims, 6 Drawing Sheets

(56) References Cited

U.S. PATENT DOCUMENTS

2011/0030513 A1* 2/2011 Kobayashi ............ B23P 19/001
 81/57.36
2018/0215588 A1* 8/2018 Butler ........................ B66B 7/02

FOREIGN PATENT DOCUMENTS

| CN | 101959638 A | 1/2011 |
| CN | 204554049 U | 8/2015 |
| CN | 105269311 A | 1/2016 |
| CN | 106439222 A | 2/2017 |

OTHER PUBLICATIONS

Non-English Chinese Office Action for Application No. 201780087312.2, dated May 28, 2020.

* cited by examiner

ASSEMBLY ASSISTING DEVICE FOR ASSISTING OF THE ASSEMBLING OF TWO WIND TURBINE COMPONENTS OF A WIND TURBINE AND METHOD FOR ASSEMBLING OF THE TWO WIND TURBINE COMPONENTS

CROSS-REFERENCE TO RELATED APPLICATIONS

This application claims priority to PCT Application No. PCT/EP2017/080459, having a filing date of Nov. 27, 2017, which is based off of DE Application No. 10 2017 202 927.7, having a filing date of Feb. 23, 2017, the entire contents both of which are hereby incorporated by reference.

FIELD OF TECHNOLOGY

The following relates to an assembly assisting device for assisting the assembling of at least two wind turbine components of a wind turbine. In addition, the following relates to a method for assembling at least two wind turbine by using the assembly assisting device.

BACKGROUND

For instance, the wind turbine components of the wind turbine are wind turbine tower units (sections, segments) of a wind turbine tower. These units are assembled together by bolts. For that, up to M48 hexagon bolts are commonly used.

The higher the wind turbine towers the bigger the bolts which are used for the assembling of the units of the wind turbine tower. So, there is a certain demand for M56, M64, M72 or bolts and bigger. But, theses bolts are getting too heavy for manual handling.

SUMMARY

An aspect relates to provide a possibility for assembling wind turbine components with the aid of heavier bolts in comparison the state of the art.

For that, an assembly assisting device for assisting an assembling of at least two wind turbine components of a wind turbine is provided. The assembly assisting device comprises at least one bolt magazine with at least one bolt magazine store unit for storing bolts for the assembling and at least one bolt magazine attaching unit for attaching the bolt magazine to at least one attaching structure of at least one of the wind turbine components.

In addition, a method for assembling at least two wind turbine components of the wind turbine with following steps is provided: a) providing of the wind turbine components and providing of at least one assembly assisting device including bolts and b) assembling of the wind turbine components with the aid of the bolts of the bolt magazine store unit of the assembly assisting device.

The bolt magazine store unit and the bolt magazine attaching unit are connected together such that they form a single article.

The bolts are fixing units for a fixed connection of the wind power turbine components. For instance, the bolts are M64 or M72 bolts. With the aid of the bolt magazine store unit the bolts are stored.

The bolt magazine store unit comprises at least one bolt magazine store structure. With the aid of this bolt magazine store structure a well organized and clearly storing of the bolts is possible. By use of the bolt magazine with the bolt magazine store structure, the bolts can be loaded into the bolt magazine in a warehouse or elsewhere (or can be re-loaded on-site) by use of traditional industrial handling equipment (i.e. the bolts not need to be handled manually during the loading process).

The loaded bolt magazine can be transported to the assembling site of the wind power components. Therefore, in a exemplary embodiment, the bolt magazine attaching unit is adapted to be attached to at least one transport device for transporting the assembly assisting device. The transport device comprises at least one transport frame. The bolt magazine and the transport device (e.g. the transport frame) are (detachably) connected together. By this, a safe and reliable transporting of the bolts to the assembling site for the assembling of the wind turbine components is possible.

After the transportation the assembly assisting device is used for the assembling of the wind turbine components. For that, the assembly assisting device and one of the wind turbine components are connected together. Looking at a exemplary embodiment of the method, the step a) includes an attaching of the assembly assisting device to at least one of the wind turbine components and/or to at least one attaching structure via the bolt magazine attaching unit.

After the assembling the bolt magazine can remain connected to the wind turbine component. But is advantageous to reuse the bolt magazine of the assembly assisting device. So, in an exemplary embodiment, the bolt magazine attaching unit and the attaching structure of the wind power component are adapted to be detachably connected together. The bolt magazine is detachable attached to the wind turbine component.

The assembly assisting device can be used for every kind of wind turbine component. Preferably, at least one of the wind turbine components is selected from the group consisting of wind turbine blade, wind turbine tower, wind turbine hub, wind turbine nacelle and units thereof. E.g. wind turbine tower unit is a wind turbine tower sector (segment) of a wind turbine tower.

With the aid of the assembly assisting device different kinds of assembling of wind turbine components can be assisted. In an exemplary embodiment, the step a) includes an erecting of the wind turbine component. For instance, the wind turbine component is a wind turbine tower segment. The assembly assisting device is used for the erecting of the wind turbine tower.

The assembly assisting device with the bolt magazine can be attached to the attaching structure of the wind turbine component during any production step of the wind turbine. For instance, the assembly assisting device with the filled bolt magazine can be assembled in a manufacturing factory of the wind turbine component before its shipping. In a preferred embodiment, the attaching of the assembly assisting device to the attaching structure is carried out before, during or after a transporting of the assembly device to a site of the wind turbine. This is especially advantageous for an erection of a wind turbine tower. So, in an exemplary embodiment, step a) includes an erecting of the wind turbine component. For instance, the wind turbine tower is assembled with the aid of the assembly assisting device on-site or is assembled in a harbor and is shipped after that to the site.

Following notes concerning embodiments of the invention have to be made:

The inventive step is the fact that the bolts are being organized by a bolt magazine store structure (different from the structure the bolts are to be used in) that assures that he bolts can be released in a predefined place and in a predefined position.

The bolt magazine of the assembly assisting device can either be fitted to the wind turbine component (e.g. wind turbine tower section) on the installation site of the wind turbine or it can be fitted to the wind turbine tower component before the wind turbine tower component is transported to the installation site.

The assembly assisting device is lifted together with the tower sector. When the bolts have to be used they are released from the bolt magazine store structure of bolt magazine store unit the assembly assisting device.

The bolt magazine store structure can then be a removable part or fixed part of the wind turbine component or it can be both.

Alternatively the assembly assisting device with bolt magazine store unit can be attached to the wind turbine component tower before the wind turbine component is transported to the installation site of the wind turbine.

BRIEF DESCRIPTION

Some of the embodiments will be described in detail, with reference to the following figures, wherein like designations denote like members, wherein.

DETAILED DESCRIPTION

Figure 1:
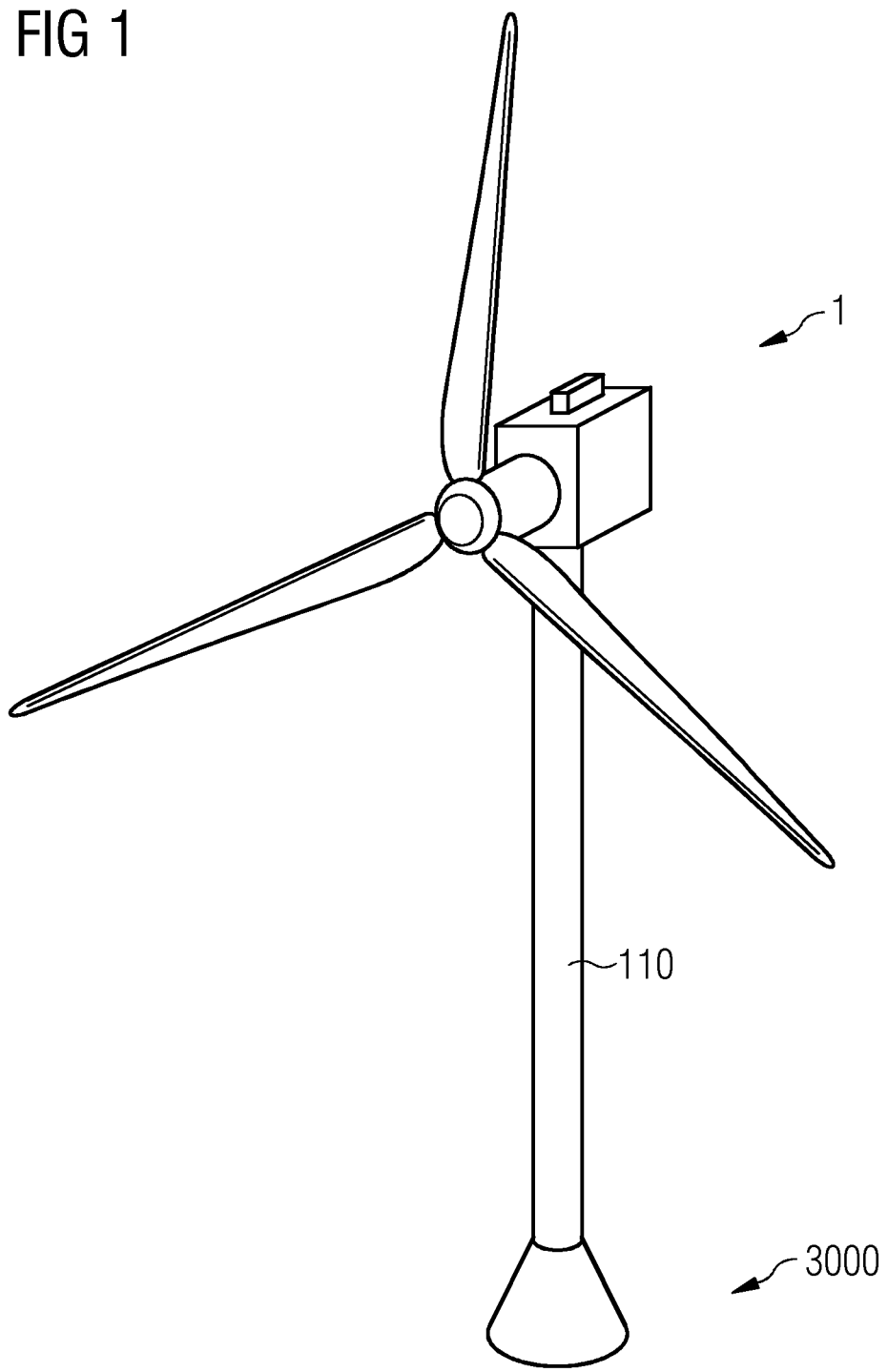
FIG. 1 shows a wind turbine.
Figure 2:
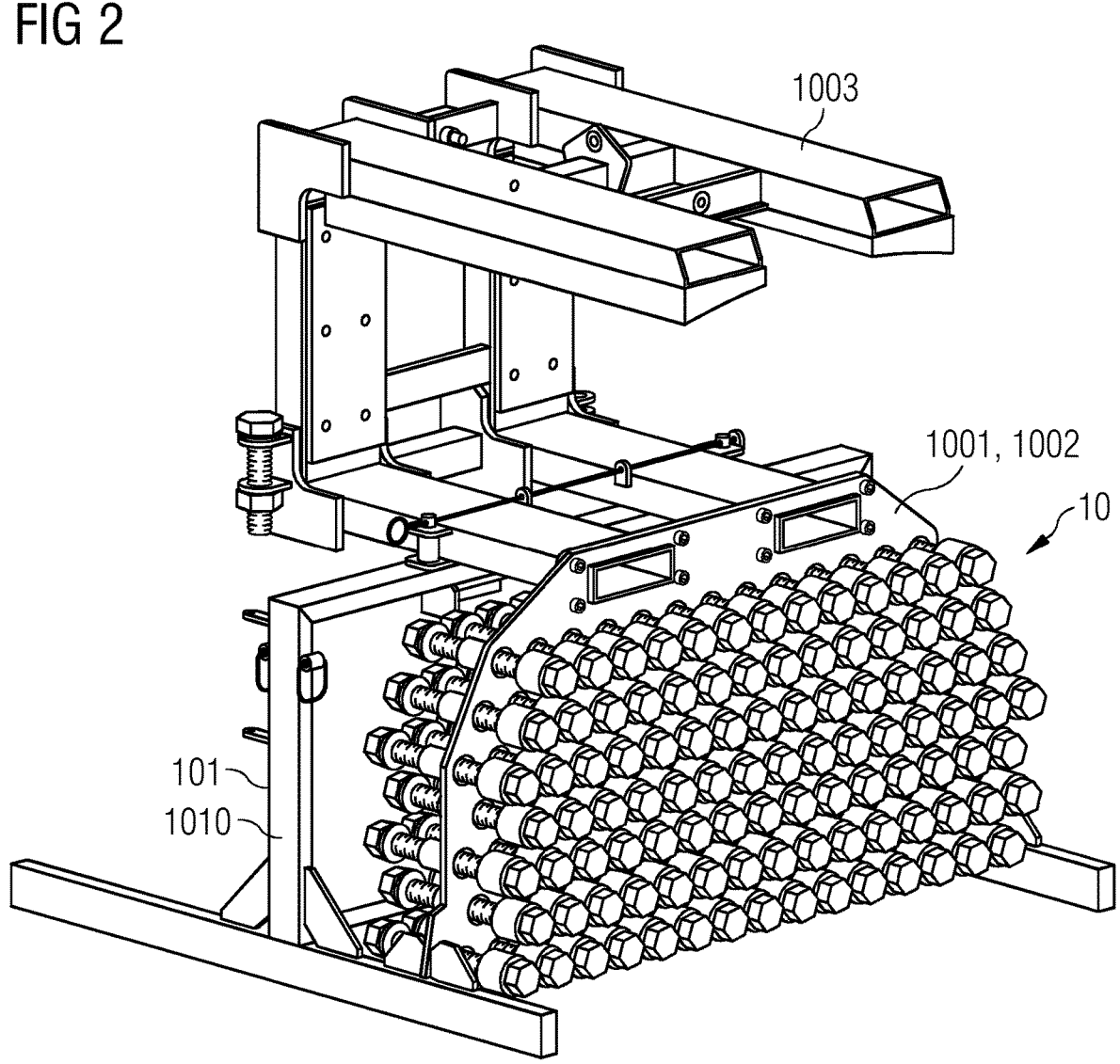
FIG. 2 shows an assembly assisting device in a perspective view.
Figure 3:
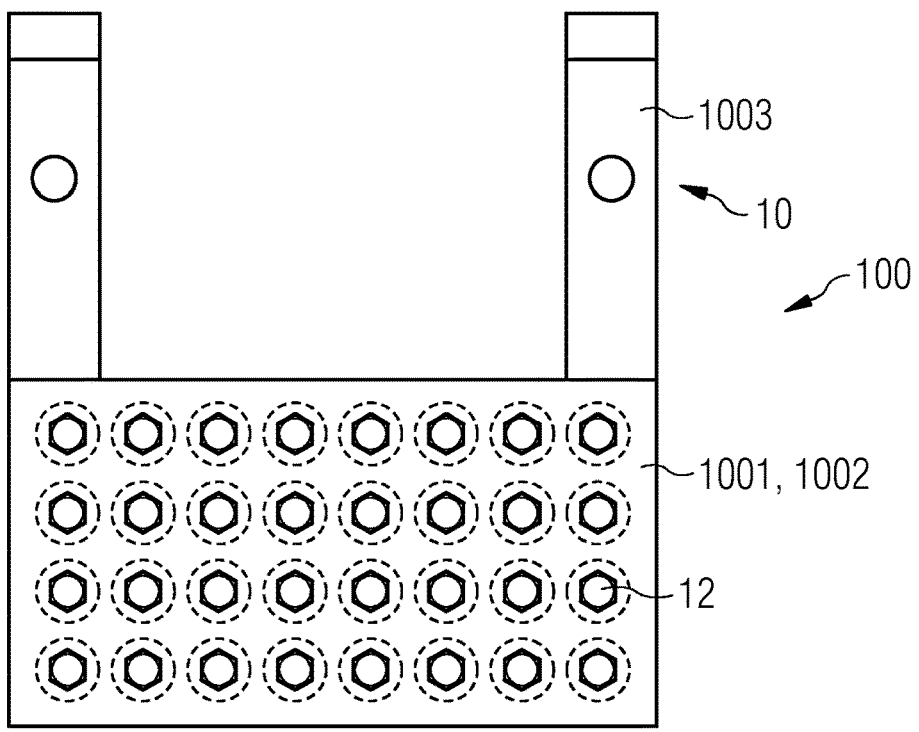
FIG. 3 shows the assembly assisting device of FIG. 2 in a first side view.
Figure 4:
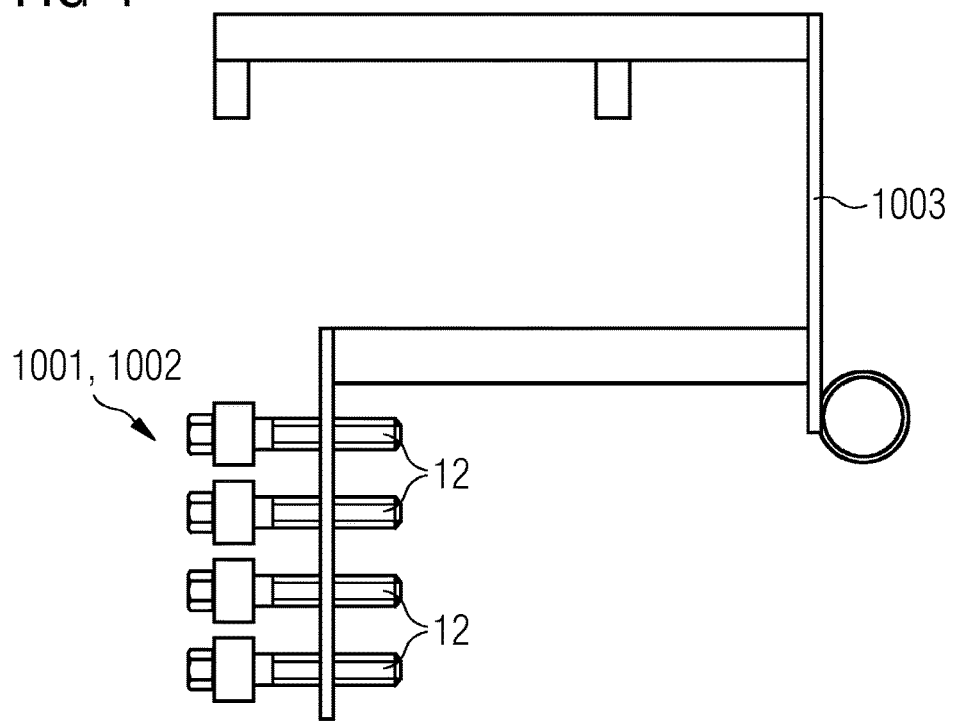
FIG. 4 shows the assembly assisting device of FIG. 2 in a second side view perpendicular to the first side view.

Concerning the embodiment, an assembly assisting device 10 for assisting an assembling at least two wind turbine components 11 of a wind turbine 1 is described. The wind turbine components are wind turbine tower sections 11 of a wind turbine tower 110.

The assembly assisting device 10 comprises a bolt magazine 100 with a bolt magazine store unit 1001. The bolt magazine store unit 1001 comprises a magazine store structure 1002 for storing bolts 12 for the assembling. The bolts for the assembling are bolts M56, M64, M72 or bigger.

In addition, the assembly assisting device 10 comprises a bolt magazine attaching unit 1003 for attaching the bolt magazine 100 to an attaching structure 111 of a wind tower section 11. The bolt magazine attaching unit 1003 is U shaped such that it can easily be hooked to the wind turbine section of the wind turbine tower.

The bolt magazine attaching unit 1003 and the attaching structure 111 are detachably connected to each other.

The bolt magazine attaching unit 1003 is adapted to be attached to a transport device 101 for transporting the assembly assisting device 10. The transport device 101 comprises at transport frame 1010. With the aid of the transport frame 1010 the assembly assisting device can be transported.

Figure 5:
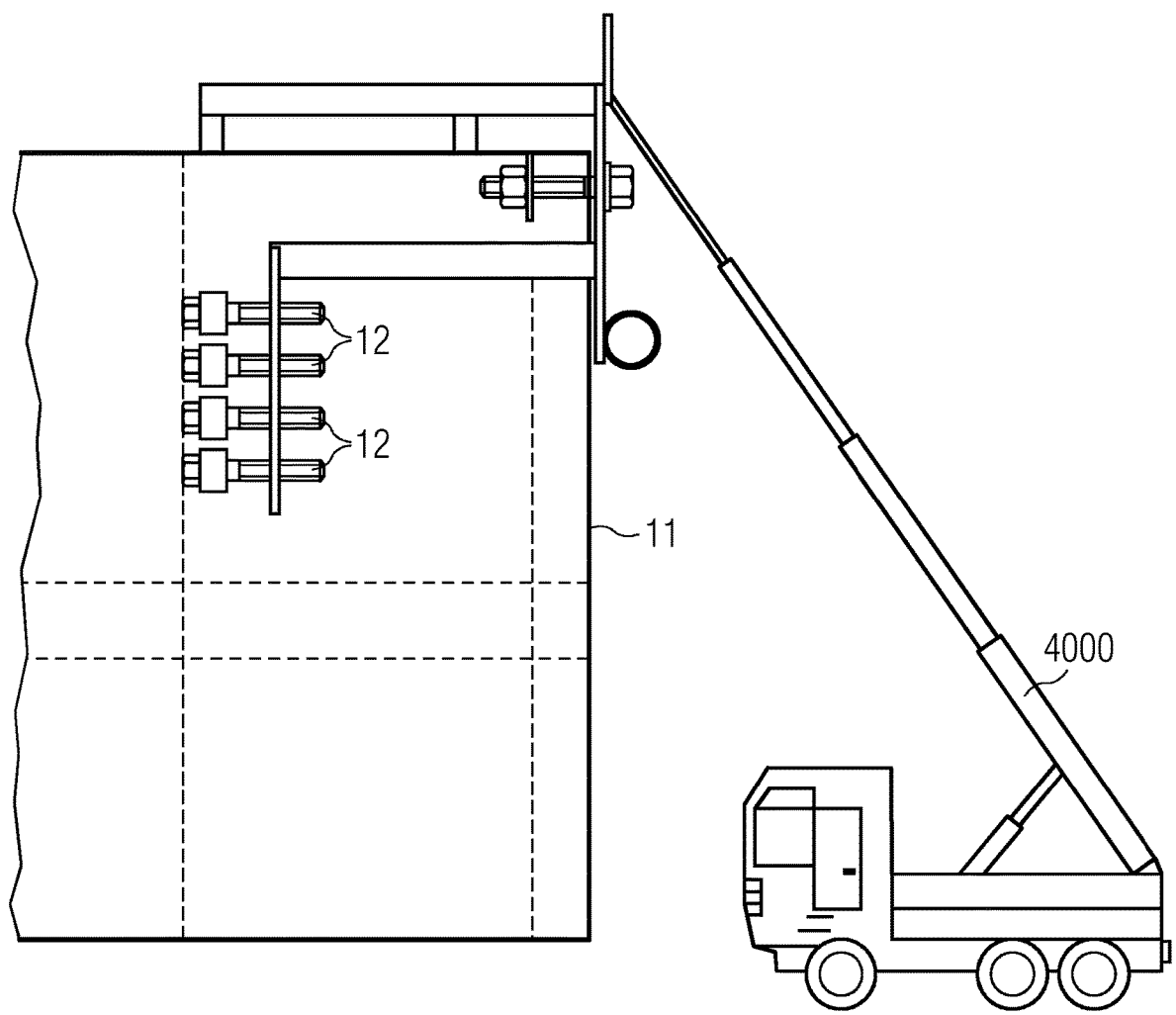
FIG. 5 shows an installation of the assembly assisting device with a loaded bolt magazine.
Figure 6:
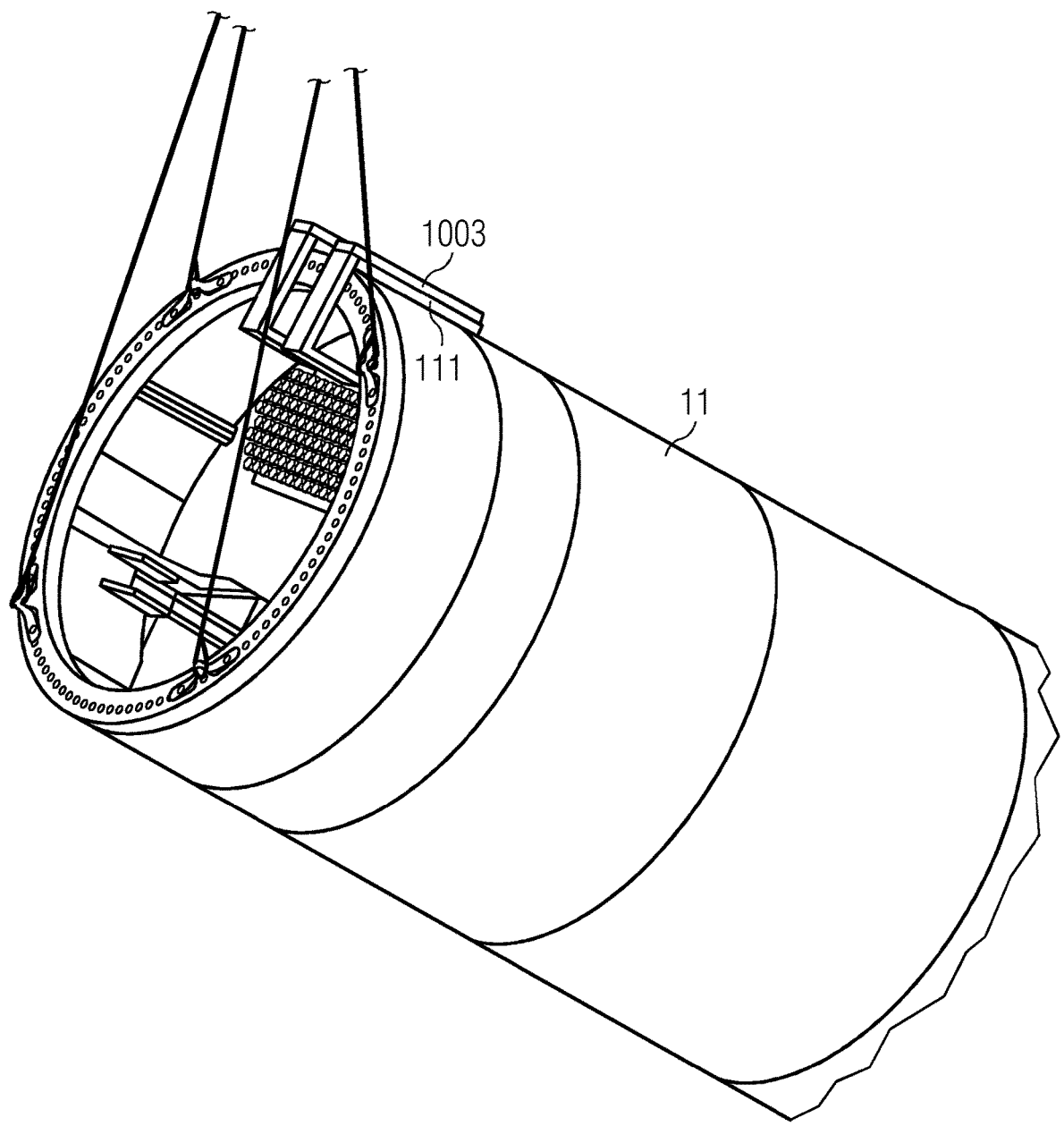
FIG. 6 shows the assembly device which is attached to section of the wind turbine tower in a perspective view.
Figure 7:
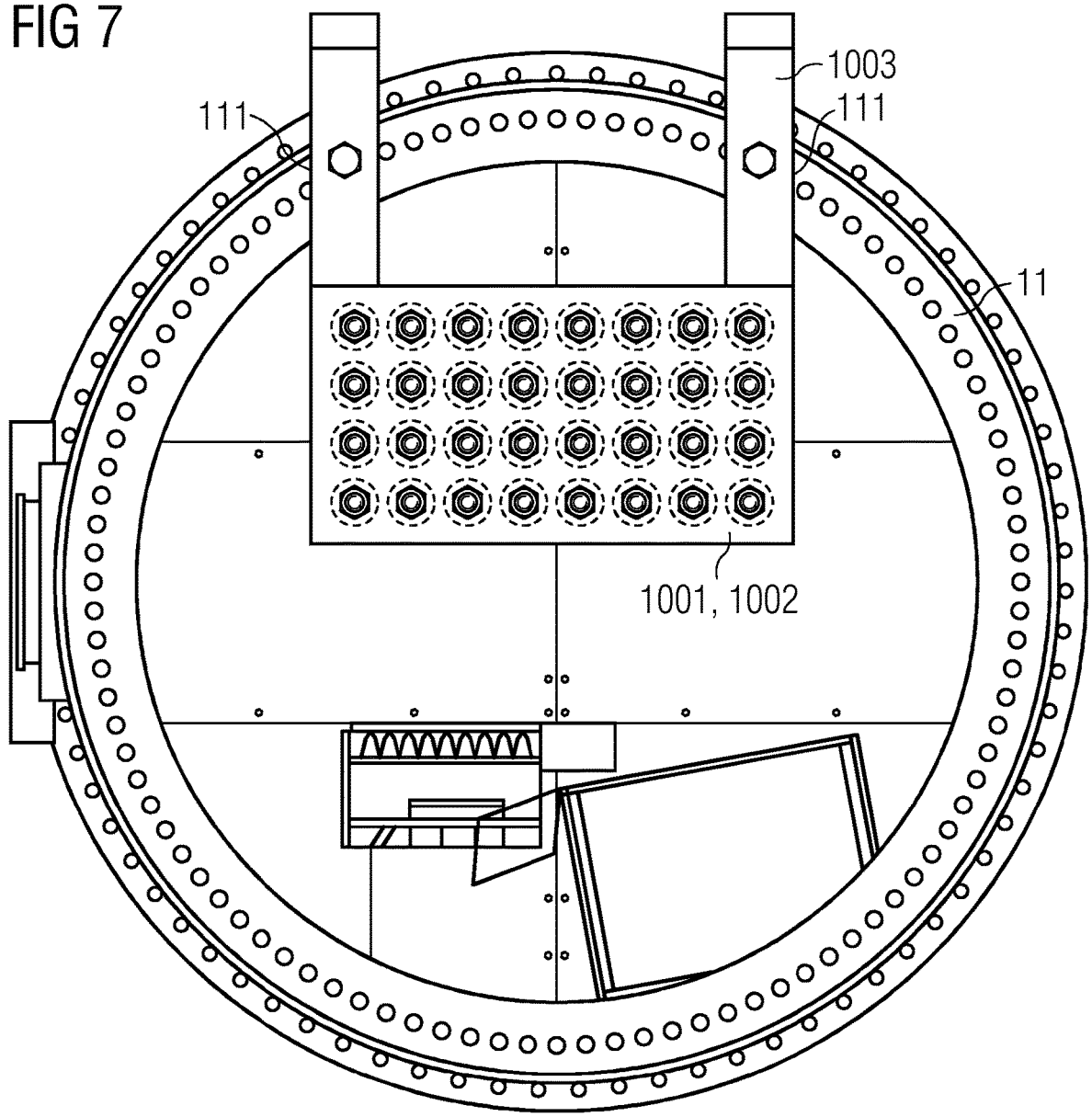
FIG. 7 shows the assembly assisting device of FIG. 5 in a view on the top of the section of the wind turbine tower.

After the detaching of the assembly assisting device 10 from the transport frame 1010 of the transport device 101 the assembly assisting device 10 is attached to a wind turbine tower section 11 with the aid of a crane 4000 (FIG. 5).

Figure 8:
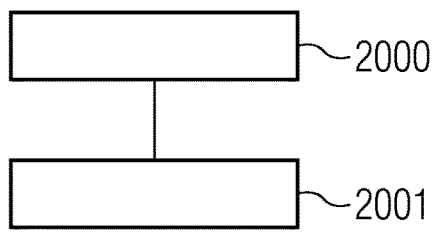
FIG. 8 shows a method for assembling at least two wind turbine tower segments of a wind turbine.

The method for assembling at least two wind turbine tower segments 11 of the wind turbine 1 comprises following steps (FIG. 8): a) providing 2000 of the wind turbine tower segments 11 and providing 2000 of an assembly assisting device 10 including bolts 12 and b) assembling 2001 of the wind turbine tower segments 11 with the aid of the bolts 12 of the bolt magazine store unit 1001 of the assembly assisting device 10. The sub steps of step a) providing of the wind turbine tower segments 11 and providing of an assembly assisting device 10 including bolts 12 are done independently.

The loading of the bolt magazine store structure 1002 of the bolt magazine store unit 1001 with bolts 12 is carried out in a warehouse. Alternatively, the loading is carried on site. After that, the bolt magazine 100 with the loaded bolt magazine store structure 1002 of the bolt magazine store unit 1001 is attached to the transport frame 1010 of the transport device 101.

The transport device 101 is transported to the site 3000 (or pre assembly site, e.g. a harbor) of the wind turbine 1. At the site 3000, the assembly assisting device 10 is detached from the transport device 101 and attached to one horizontally oriented wind turbine sector 11 of the wind turbine tower 110. After that, the wind turbine sector 11 of the wind turbine tower 110 is erected resulting in a vertical orientation of the wind turbine tower section 11. The vertically oriented wind turbine tower section 11 is assembled with another vertically oriented wind turbine tower section 11. For that, the bolts 12 of the bolt magazine store structure 1002 of the bolt magazine store unit 1001 re used.

After the assembling the assembly assisting device is detached from the respective tower section 11. By that, the assembly assisting device 10 can be used for the assembling of further components of the wind turbine, for instance for the assembling of additional wind turbine tower sectors 11 or a nacelle of the wind turbine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for assembling at least two wind turbine components of a wind turbine, the method comprising the following steps:
   a) providing the at least two wind turbine components, providing bolts, and providing at least one assembly assisting device, wherein the assembly assisting device has at least one bolt magazine with at least one bolt magazine store unit for storing the bolts and at least one bolt magazine attaching unit for attaching the bolt magazine to at least one attaching structure of at least one of the at least two wind turbine components; and
   b) assembling the wind turbine components using the bolts of the bolt magazine store unit of the assembly assisting device.

2. The method according to claim 1, wherein step a) includes an attaching of the assembly assisting device to the at least one of the at least two wind turbine components and/or the at least one attaching structure, via the bolt magazine attaching unit.

3. The method according to claim 1, wherein step a) includes an erecting of at least one of the at least two wind turbine components.

4. The method according to claim 1, wherein an attaching of the assembly assisting device to the attaching structure is carried out before, during, or after a transporting of the assembly assisting device to a site of the wind turbine.

5. The method according to claim 1, wherein the bolt magazine store unit has at least one bolt magazine store structure.

6. The method according to claim 1, wherein the bolt magazine attaching unit is configured to be attached to at least one transport device for transporting the assembly assisting device.

7. The method according to claim 6, wherein the transport device has at least one transport frame.

8. The method according to claim 1, wherein the bolt magazine attaching unit and the at least one attaching structure are configured to be detachably connected together.

9. The method according to claim 1, wherein at least one of the at least two wind turbine components is selected from a group consisting of a wind turbine blade, a wind turbine tower, a wind turbine hub, a wind turbine nacelle, and units thereof.

* * * * *